United States Patent
Saunders et al.

[15] 3,686,826
[45] Aug. 29, 1972

[54] POLYMER FINISHER

[72] Inventors: Leonard Victor John Saunders, Richmond, Va.; David Rochell, Sarnia, Ontario, Canada

[73] Assignee: Allied Chemical Corporation, New York, N.Y.

[22] Filed: Nov. 19, 1970

[21] Appl. No.: 90,977

[52] U.S. Cl. ..........................55/52, 23/785, 55/202, 55/203
[51] Int. Cl. .............................................A01d 47/16
[58] Field of Search .....55/52, 202, 203, 207; 23/285

[56] References Cited

UNITED STATES PATENTS

| | | | |
|---|---|---|---|
| 3,358,422 | 12/1967 | Schee | 55/52 |
| 3,591,344 | 7/1971 | Schnock et al. | 23/285 |
| 3,595,627 | 7/1971 | Abbott et al. | 23/285 |
| 2,758,915 | 8/1956 | Vodonik | 23/285 |
| 3,498,762 | 3/1970 | Schee et al. | 55/52 |

*Primary Examiner*—John Adee
*Attorney*—Luther A. Marsh and Roy H. Massengill

[57] ABSTRACT

Apparatus for finishing viscous materials, as in polycondensation reactions for the production of polyamides and polyesters wherein a low viscosity liquid is fed into one end of a cylindrical vessel having one or more vapor outlets and at least one horizontally mounted agitator, mounted for rotation within said vessel, and having a drive shaft running throughout the full length of said vessel having spoked wheels interspaced and interconnected by circularly arranged serrated blades, said wheels being spaced closer together at the feed end and being spaced at greater distances towards a discharge port located at the opposite end from the feed end of said vessel, said serrated blades being located in such a way as to keep a close clearance between the blade and wall and thus maintain a continuous shear gradient between blade and wall, and carry an amount of liquid with them each time they leave the liquid surface which is poured from the blade near the apex of its travel and in this manner an unsupported corrugated film is formed parallel to the axis of the drive shaft yielding a large surface area which aids in rapid evaporation of volatile material thus expediting the polycondensation reaction.

7 Claims, 5 Drawing Figures

PATENTED AUG 29 1972 3,686,826

*INVENTOR.*
*L.V.J. SAUNDERS*
*DAVID ROCHELL*

BY

*Luther A. Marsh*
ATTORNEY

POLYMER FINISHER

BACKGROUND OF THE INVENTION

This invention relates to a method and an apparatus for the conversion of liquid of low viscosity into a liquid of high viscosity. More particularly, this invention relates to a method and an apparatus for the conversion of liquid of low viscosity into a liquid of high viscosity by removing volatile material during said conversion while maintaining a continuous shear gradient between rotor and wall and preventing build-up of degradation products. Even more particularly, this invention relates to a method and an apparatus to convert low viscosity liquid into a very high viscosity range to produce polymer of fiber-grade viscosity. Still more particularly, it relates to degassing or removal of volatiles from a mixture being polymerized by condensation in which serrated substantially radial scoop blades are moved through the liquid while remaining parallel to the level of the liquid and that become traverse to the level of the liquid upon leaving the liquid, thus forming an unsupported film for degassing and the removal of volatiles.

The degassing and removing of volatiles from condensation type reactions are known. As more stringent requirements are continuously being placed upon quality of polymeric materials, greater and more thorough studies are being made in an effort to produce the quality necessary and required. One such effort is shown in U.S. Pat. No. 3,358,422, which issued on Dec. 19, 1967. The patentee here illustrates the degassing of a viscous liquid polymer reaction mass during the intermediate polycondensation stages. In this patented process the rod-like members were utilized specifically for the purpose of filming a viscous liquid within a very specific viscosity range, namely, between 30 and 500 poises. If the viscosity is less than 30 poises or more than 500 poises no continuous film can be drawn from the liquid mass and thus the apparatus is inoperable. Other similar, yet quite specific efforts have been undertaken as depicted in U.S. Pat. Nos. 2,758,915 and 2,869,838, and others. To prepare a polymer having substantially all volatiles removed while maintaining a continuous reaction gradient with substantially no degradation while producing a polycondensation polymer up to 30,000 poises would make a substantial contribution to this highly complex art.

It is therefore a prime object of this invention to provide an improved polymer finisher apparatus and method for producing an improved fiber grade polymer.

A further object of this invention is to provide an improved polymer finisher apparatus and method for producing an improved fiber grade polymer wherein substantially all volatile material is removed, a continuous shear gradient is maintained while substantially no degradation of said polymer occurs.

Other objects and a more complete understanding of the present invention can be had by referring to the following description and claims.

SUMMARY OF THE INVENTION

According to the present invention there is provided a cylindrical vessel for finishing liquid viscous material which is provided with an inlet and outlet for said material at opposite ends of said vessel, and at least one outlet for the removal of volatile material, a rotatable shaft mounted substantially concentric with the cylindrical axis for rotation within said vessel and having a drive shaft for rotating said shaft, said shaft having spoked wheels interspaced and interconnected by circularly arranged serrated substantially radial scoop blades, said wheels being interspaced closer nearer the feed end and being gradually spaced at greater distances nearer the outlet end of said vessel, said blades being so positioned as to maintain a close clearance from the inside surface of said vessel, maintain a continuous shear gradient, and carry an amount of said material with them each time they leave the liquid surface forming an unsupported corrugated film parallel to the axis of said drive shaft then yielding a large surface area for rapid evaporation of volatile material thus expediting the finishing of said liquid viscous material.

A better understanding of the nature and objects of this invention will be seen when reference is made to the following detailed description taken in connection with the accompanying drawings, in which.

Figure 1:
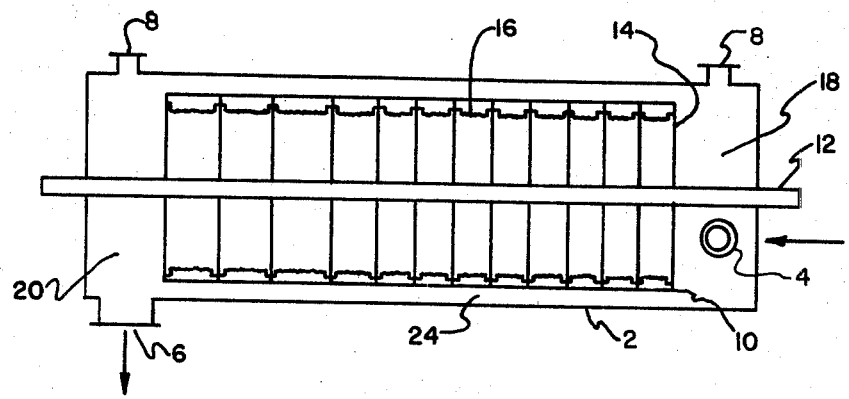
FIG. 1 is a longitudinal axial section of a cylindrical polymerization vessel with cylindrical agitator shown in elevation.
Figure 2:
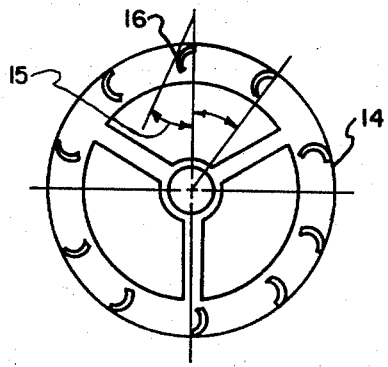
FIG. 2 is a perspective view of one example of the spoked wheel or dynamic baffle showing the spokes of the wheel, the drive shaft, the serrated blades attached to said wheel and the blade alignment angle 15 necessary for forming an unsupported film parallel to the axis of said drive shaft.
Figure 3:
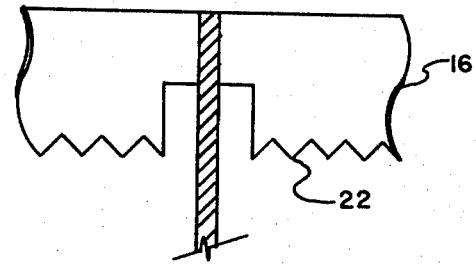
FIG. 3 is a perspective view of the serrated edge of the blade useful for an embodiment of the present invention and wherein it is attached.
Figure 4:
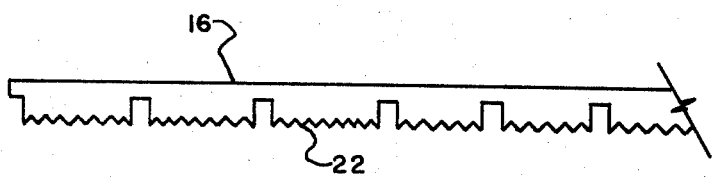
FIG. 4 is an enlarged perspective view of the variations of the serrations of the blade edge useful for an embodiment of the present invention.
Figure 5:
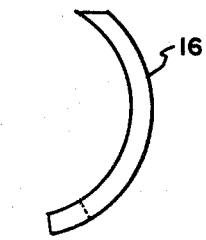
FIG. 5 is an enlarged view of one blade or scoop useful for an embodiment of the present invention.

FIG. 1 shows in longitudinal sectional elevation agitation apparatus useful according to the present invention. Vessel 2 has inlet 4 and outlet 6 which may be located other than as shown, but must be on opposite ends of vessel 2. Such inlet 4 and outlet 6 located near opposite ends of the vessel are to receive and discharge the process liquid. A vent 8 located at the top of vessel 2 may have more than one vessel exit as required for process purposes. The agitator 10 located in a rotatable manner in vessel 2 is mounted through journals, not shown, by shaft 12 and contains spoked wheel or dynamic baffle 14 having serrated blades 16. The blades 16, more specifically shown in FIG. 2 are so positioned on wheel or dynamic baffle 14 in such a way as to have an alignment angle 15 from about 10° to about 30°. The number of blades 16 in each compartment of vessel 2 can vary from about six to about 16 and can vary in number from the inlet section 18 to the outlet end section 20 of vessel 2. Each blade has a serration 22 more specifically shown in FIG. 3 and FIG. 4 on its outer edge and the serrations also can vary in width, depth and number from the inlet to the outlet end of vessel 2. FIG. 5 illustrates a single enlarged view of one blade 16 illustrating radial curvature. Each blade 16 is firmly attached to each dynamic baffle 14 at the proper alignment angle 15 in order to keep a close clearance between the blade 16 and the interior wall 24.

Operation of this apparatus, which is especially adapted to function as a reactor finisher for condensation polymerization, can readily be understood. Liquid feed polymer of comparatively low viscosity is forced by suitable means into the inlet end 4 of vessel 2 and passes to the other end and out vessel outlet 6, the flow being effected by the interrelationship of the various components of the apparatus with the polymeric liquid material being finished. No pumping, as such is brought about by the various components of the apparatus and their relationship with one another and the liquid being processed of the invention, but a normal flow is obtained commensurate with the amount of material fed to the reactor finisher. The forward movement is the result only of the addition of fresh material to the feed end of the reactor. This then retains the plug flow parameter which is desirable to give equal exposure to the environment for every element of the polymer melt. The effect of the compartments of the rotor is to give extensive peripheral mixing while minimizing axial mixing, again reinforcing the plug flow principle which is approximated practically by a large number of perfectly mixed stages, mounted in series. No forward movement or pumping action is brought about by the rotation of the rotor or agitator itself.

The unsupported corrugated film of this invention yields an improved degassed polymeric material because the film tends to be turbulent within itself which contributes to a good mass transfer rate between the film and the vapor, the film is available for mass transfer over all exposed surfaces and significantly greater than heretofore, the film in this way is made very thin which minimizes resistance to mass transfer, there is no supporting surface for flow stagnation and degradation products to build up the corrugation given to the film yields much larger surface area than heretofore with all its attendant advantages.

The corrugation given to the unsupported film is brought about by the serrations and the designated alignment angle 15. They yield a consistent corrugated film across the blade which is formed by polymer flowing over the serrations of the blade and forming a corrugated appearing film. The blade is preferably horizontal to prevent more material spilling over one end in an axial sense and giving an uneven or thick and thin type filming. The serrated blade of this invention eliminates blockage and thus is self-cleaning by angle adjustment and degree of curvature by the melt pool through which it passes upon each revolution. Thus the serrated blades of this invention yield effective means for degassing higher viscosity materials. The angle and curvature is optimized so that sufficient material is carried to form a film continuously right across the reactor finisher periphery, and yet just be exhausted by the time it reenters the melt pool to pick up a fresh load. The blade dumps the exposed material on top of the melt pool but picks up fresh material to be degassed from the bottom of the melt pool, thus accentuating the intra-stage mixing.

The feed polymer utilized in the operation of this invention may be as low as 100 poises in viscosity. The finished product viscosity may range up to 30,000 poises after the polycondensation reaction is substantially complete. The agitator 10 speed can vary from between 0.1 rpm to about 15 rpm depending upon the polymer viscosity. The clearance between the blade 16 and the vessel interior wall 24 can be as low as one-sixteenth inch in order to allow continual wiping of the surface thus eliminating any polymer buildup and thus preventing any polymer degradation from any such polymer buildup as it would be subject to excessive exposure to high temperature and vacuum with subsequent polymerization and thermal degradation. The apparatus is more preferably operated at vacuum levels between 0.1 mm Hg absolute and 50 mm Hg; however, it may be operated using an atmosphere of nitrogen or steam and under pressure if necessary for process reasons. The normal operating liquid level of vessel 2 can be between about 10 and about 60 percent of said vessel.

The blade 16 design of the apparatus of this invention is of critical significance. The design of the blade 16 along with the spoked type wheel or baffle 14 wherein it is attached allows for a rigid type construction thus yielding a stiffer shaft 12 so no essential variance can occur thus upsetting process conditions. The blades 16 are positioned in peripheral slots of the baffles or wheels 14 and prepared with serrations 22 of sufficient width and depth to provide good distribution along the entire length of blade 16 during the entire peripheral travel of the rotor blades. Preferably, a one foot space is provided at the inlet end and a two foot space is provided at the exit end of the vessel wherein a pool is allowed to form for subsequent feed purposes from said vessel. This allows plug flow to be maintained at all times during operation. The exit end of the vessel is provided with a two or twin flight screw or a four arm spider which is attached to the shaft with plows on the outer ends to allow continual wiping of the end wall thus eliminating any polymer buildup at this point.

The blade design angle with reference to obtaining best performance is also critical. In order to obtain proper filming the blade angle is substantially radial, not circumferential, thus allowing filming continuously from the time it leaves the polymer melt until it again enters the polymer melt. Further, it allows continuous filming without any film supporting means. The blade alignment angle 15 or scoop curvature adjustment can vary from about 11° to about 30°. The alignment angle 15 is defined as that angle tangent to the scoop and the radius of the wheel.

Another feature of this invention relates to the open area or distance between the spoked wheels or dynamic baffles. The distance can vary from about 2 inches to about 36 inches and provides further surface generation and also acts as a barrier to co-axial mixing between compartments. Further, this area is of such a diameter to prevent pulsing of polymer backward and forward between compartments or by passing, and, at the same time enables a definite flow forward equivalent to the initial polymer feed rate. Such design, allowing a minimum of backmixing between adjacent compartments is required to maximize the approach to plug flow and product quality. Further, the wheels or dynamic baffles are supported from the shaft by spokes which allow forward movement of the liquid while giving necessary support to the wheels and blades.

The apparatus of the invention is particularly suited for the production of polyamides and polyesters; however, it is equally suitable for any polycondensation material that volatiles evolved during polycondensation must be efficiently removed.

We claim:

1. Apparatus for finishing liquid viscous material which comprises a cylindrical vessel, an inlet and outlet for said material at opposite ends of said vessel and at least one outlet for the removal of volatile material, a rotatable agitator mounted substantially concentric with the cylindrical axis for rotation within said vessel and having a drive shaft for rotating said shaft, said shaft having spoked wheels interspaced and interconnected by circularly arranged serrated, substantially radial scoop blades, said blades having a specified curvature alignment angle, said wheels being interspaced closer nearer the feed end and being spaced at greater distances nearer the outlet end of said vessel, said blades being so positioned as to keep a close clearance between the blade and the inside wall of said vessel, maintain a continuous shear gradient between the blade and inside vessel wall, and carry an amount of said liquid material with them each time they leave the liquid surface forming an unsupported corrugated film parallel to the axis of said drive shaft thus yielding a large surface area for rapid evaporation of volatile material thus expediting the finishing of said liquid viscous material.

2. The apparatus as defined in claim 1 wherein the scoop curvature alignment angle is from about 10° to about 30°.

3. The apparatus as defined in claim 1 wherein the serration size in both width and depth can be adjusted for control of film thickness of the viscous material.

4. The apparatus as defined in claim 1 wherein the agitator components are so interrelated and positioned in relation to said material that no pumping of the viscous material takes place.

5. The apparatus as defined in claim 1 wherein agitator components are so interrelated to said vessel to continually remove material being processed from the interior surfaces of the vessel as the agitator rotates.

6. The apparatus as defined in claim 1 wherein the scoop curvature alignment can vary from the feed end of the vessel to discharge end of the vessel.

7. A process for the continuous polycondensation of a liquid viscous material having a viscosity in the range of up to 30,000 poises consisting of a linear saturated or unsaturated polyester or polyamide by heating the melt under pressure and wherein it is desired to effect degassing of said materials with consequent removal of volatile materials, comprising the steps of:

a. continuously feeding a quantity of the liquid into an inlet chamber of a revolving cylindrical agitator within a vessel;

b. controlling and maintaining liquid quantity input with liquid quantity output within said chamber to a liquid level within said vessel of from about 10 to about 60 percent thereof;

c. lifting continuously a quantity of the liquid as an unsupported corrugated film in a continuous movement substantially perpendicular to the surface of said liquid by passing an elongate member through said material having spoked wheels interspaced and interconnected by circularly arranged serrated substantially radial scoop blades having a designated alignment angle in relation to the wheel wherein it is attached;

d. stretching said unsupported film within each chamber of said vessel continuously from the exit point of said liquid until reentry of said unsupported film on the side opposite the exit point of said liquid by placement and interrelationship of each compartment component in relation to the liquid material being processed and the speed in which the agitator is revolved;

e. evacuating continuously volatile materials during said polycondensation, and f. recovering said degassed liquid viscous material.

* * * * *